(12) United States Patent
Wang et al.

(10) Patent No.: US 12,449,352 B2
(45) Date of Patent: Oct. 21, 2025

(54) OPTICS FOR MEASUREMENT OF THICK FILMS AND HIGH ASPECT RATIO STRUCTURES

(71) Applicant: KLA Corporation, Milpitas, CA (US)

(72) Inventors: David Y. Wang, Santa Clara, CA (US); Shankar Krishnan, Cupertino, CA (US)

(73) Assignee: KLA Corporation, Milpitas, CA (US)

( * ) Notice: Subject to any disclaimer, the term of this patent is extended or adjusted under 35 U.S.C. 154(b) by 132 days.

(21) Appl. No.: 18/210,558

(22) Filed: Jun. 15, 2023

(65) Prior Publication Data
US 2024/0418635 A1    Dec. 19, 2024

(51) Int. Cl.
*G01N 21/31*    (2006.01)

(52) U.S. Cl.
CPC ... *G01N 21/31* (2013.01); *G01N 2201/06113* (2013.01)

(58) Field of Classification Search
CPC ............... G01B 11/02; G01B 2210/56; G01N 2021/213; G01N 21/31; G01N 2201/06113; G03F 7/70625; G03F 7/70633
See application file for complete search history.

(56) References Cited

U.S. PATENT DOCUMENTS

| | | | |
|---|---|---|---|
| 5,608,526 A | 3/1997 | Piwonka-Corle et al. | |
| 5,859,424 A | 1/1999 | Norton et al. | |
| 6,023,338 A | 2/2000 | Bareket | |
| 6,429,943 B1 | 8/2002 | Opsal et al. | |
| 6,716,646 B1 | 4/2004 | Wright et al. | |
| 6,778,275 B2 | 8/2004 | Bowes | |
| 6,787,773 B1 | 9/2004 | Lee | |
| 6,992,764 B1 | 1/2006 | Yang et al. | |
| 7,230,701 B2 | 6/2007 | Stehle et al. | |
| 7,242,477 B2 | 7/2007 | Mieher et al. | |
| 7,321,426 B1 | 1/2008 | Poslavsky et al. | |

(Continued)

FOREIGN PATENT DOCUMENTS

| | | |
|---|---|---|
| JP | 2000-097666 A | 4/2007 |
| JP | 2008-004638 A | 1/2008 |

OTHER PUBLICATIONS

Gostein et al., "Measuring deep-trench structures with model-based IR," Solid State Technology, vol. 49, No. 3, pp. 38-42, Mar. 1, 2006.

(Continued)

*Primary Examiner* — Hina F Ayub
(74) *Attorney, Agent, or Firm* — HUSE IP Law

(57) ABSTRACT

Methods and systems for performing spectroscopic ellipsometry measurements of semiconductor structures with reflective collection relay optics having demagnification from the spectrometer slit to the detector are presented herein. The demagnification effectively increases the NA at the detector and reduces the measurement spot size at the wafer imaged onto the detector. In this manner, the demagnification maintains high spectral resolution at the detector, particularly in the ultraviolet wavelength range, e.g., 120-400 nanometers, while maintaining a small collection NA at the wafer, e.g., collection NA less than 0.05. The small collection NA enables high fringe contrast, signal fidelity, and sensitivity, when measuring thick, multiple layer stacks, e.g., 200-300 layers.

20 Claims, 8 Drawing Sheets

(56) References Cited

U.S. PATENT DOCUMENTS

| | | |
|---|---|---|
| 7,406,153 B2 | 7/2008 | Berman |
| 7,478,019 B2 | 1/2009 | Zangooie et al. |
| 7,626,702 B2 | 12/2009 | Ausschnitt et al. |
| 7,656,528 B2 | 2/2010 | Abdulhalim et al. |
| 7,826,071 B2 | 11/2010 | Shchegrov et al. |
| 7,842,933 B2 | 11/2010 | Shur et al. |
| 7,873,585 B2 | 1/2011 | Izikson |
| 7,929,667 B1 | 4/2011 | Zhuang et al. |
| 7,933,026 B2 | 4/2011 | Opsal et al. |
| 8,068,662 B2 | 11/2011 | Zhang et al. |
| 8,138,498 B2 | 3/2012 | Ghinovker |
| 8,860,937 B1 | 10/2014 | Dziura et al. |
| 9,291,554 B2 | 3/2016 | Kuznetsov et al. |
| 9,826,614 B1 | 11/2017 | Bakeman et al. |
| 9,885,962 B2 | 2/2018 | Veldman et al. |
| 9,915,522 B1 | 3/2018 | Jiang et al. |
| 10,013,518 B2 | 7/2018 | Bakeman et al. |
| 10,101,670 B2 | 10/2018 | Pandev et al. |
| 10,152,678 B2 | 12/2018 | Pandev et al. |
| 10,324,050 B2 | 6/2019 | Hench et al. |
| 10,352,695 B2 | 7/2019 | Dziura et al. |
| 10,545,104 B2 | 1/2020 | Hench et al. |
| 10,690,602 B2 | 6/2020 | Sapiens et al. |
| 10,775,323 B2 | 9/2020 | Gellineau et al. |
| 10,801,953 B2 | 10/2020 | Wang et al. |
| 2003/0021465 A1 | 1/2003 | Adel et al. |
| 2007/0176128 A1 | 8/2007 | Van Bilsen et al. |
| 2007/0221842 A1 | 9/2007 | Morokuma et al. |
| 2008/0175349 A1* | 7/2008 | McGuire ............. G03F 7/70291 378/34 |
| 2009/0152463 A1 | 6/2009 | Toyoda et al. |
| 2011/0266440 A1 | 11/2011 | Boughorbel et al. |
| 2012/0292502 A1 | 11/2012 | Langer et al. |
| 2013/0003050 A1 | 1/2013 | Zhu et al. |
| 2013/0114085 A1 | 5/2013 | Wang et al. |
| 2013/0208279 A1 | 8/2013 | Smith |
| 2013/0304424 A1 | 11/2013 | Bakeman et al. |
| 2014/0019097 A1 | 1/2014 | Bakeman et al. |
| 2014/0064445 A1 | 3/2014 | Adler |
| 2014/0111791 A1 | 4/2014 | Manassen et al. |
| 2014/0172394 A1 | 6/2014 | Kuznetsov et al. |
| 2014/0222380 A1 | 8/2014 | Kuznetsov et al. |
| 2014/0297211 A1 | 10/2014 | Pandev et al. |
| 2015/0046121 A1 | 2/2015 | Dziura et al. |
| 2015/0110249 A1 | 4/2015 | Bakeman et al. |
| 2015/0117610 A1 | 4/2015 | Veldman et al. |
| 2015/0204664 A1 | 7/2015 | Bringoltz et al. |
| 2015/0285749 A1 | 10/2015 | Moncton et al. |
| 2015/0300965 A1 | 10/2015 | Sezginer et al. |
| 2016/0202193 A1 | 7/2016 | Hench et al. |
| 2016/0245741 A1 | 8/2016 | Krishnan et al. |
| 2016/0320319 A1 | 11/2016 | Hench et al. |
| 2017/0167862 A1 | 6/2017 | Dziura et al. |
| 2018/0106735 A1 | 4/2018 | Gellineau et al. |
| 2018/0113084 A1 | 4/2018 | Hench et al. |
| 2018/0328868 A1 | 11/2018 | Bykanov et al. |
| 2019/0017946 A1 | 1/2019 | Wack et al. |
| 2019/0049365 A1* | 2/2019 | Blasenheim .......... G01J 3/0229 |
| 2019/0293578 A1 | 9/2019 | Gellineau |
| 2020/0089135 A1* | 3/2020 | Goorden ................ G03F 9/7088 |
| 2021/0010949 A1* | 1/2021 | Xu ..................... G01N 21/9505 |
| 2021/0207956 A1 | 7/2021 | Shchegrov et al. |

OTHER PUBLICATIONS

Lemaillet, Germer, Kline et al., "Intercomparison between optical and x-ray scatterometry measurements of FinFET structures" by Proc. SPIE, v.8681, p. 86810Q (2013).

Kline et al., "X-ray scattering critical dimensional metrology using a compact x-ray source for next generation semiconductor devices," J. Micro/Nanolith. MEMS MOEMS 16(1), 014001 (Jan.-Mar. 2017).

International Search Report mailed on Sep. 24, 2024, for PCT Application No. PCT/US2024/032675 filed on Jun. 5, 2024, by KLA Corporation, 3 pages.

* cited by examiner

OPTICS FOR MEASUREMENT OF THICK FILMS AND HIGH ASPECT RATIO STRUCTURES

TECHNICAL FIELD

The described embodiments relate to metrology systems and methods, and more particularly to methods and systems for improved measurement of semiconductor structures.

BACKGROUND INFORMATION

Semiconductor devices such as logic and memory devices are typically fabricated by a sequence of processing steps applied to a specimen. The various features and multiple structural levels of the semiconductor devices are formed by these processing steps. For example, lithography among others is one semiconductor fabrication process that involves generating a pattern on a semiconductor wafer. Additional examples of semiconductor fabrication processes include, but are not limited to, chemical-mechanical polishing, etch, deposition, and ion implantation. Multiple semiconductor devices may be fabricated on a single semiconductor wafer and then separated into individual semiconductor devices.

Metrology processes are used at various steps during a semiconductor manufacturing process to detect defects on wafers to promote higher yield. Optical metrology techniques offer the potential for high throughput without the risk of sample destruction. A number of optical metrology based techniques including scatterometry and reflectometry implementations and associated analysis algorithms are commonly used to characterize critical dimensions, film thicknesses, composition, overlay and other parameters of nanoscale structures.

Flash memory and dynamic random access memory (DRAM) architectures are transitioning from two dimensional floating-gate architectures to fully three dimensional geometries. In some examples, film stacks and etched structures are very deep (e.g., up to six micrometers in depth), and include many layers. For example, state of the art NAND memory structures include 200-300 layers. Such high aspect ratio, multiple layer structures create challenges for film and CD measurements. The ability to measure the critical dimensions that define the shapes of holes and trenches of these structures is critical to achieve desired performance levels and device yield. In addition, many semiconductor architectures employ thick, opaque material layers such as amorphous-carbon layers, tungsten layers, and hard mask layers. Illumination light in the vacuum ultraviolet, ultraviolet, visible, and short infrared wavelength ranges (i.e., wavelengths below approximately 1 micrometer) do not sufficiently penetrate these opaque layers, resulting in measurement signals with low signal to noise ratio or no measureable signal at all.

Many optical techniques suffer from low signal-to-noise ratios (SNRs), as only a small fraction of the illumination light is able to reach the bottom of high aspect ratio features, and reflect upwards to the detector. Thus, many available high-throughput metrology techniques are unable to reliably perform CD and film measurements of high aspect ratio structures. Critical dimension, small angle X-ray scatterometry (CD-SAXS), normal incidence reflectometry, and scatterometry are being explored as measurement solutions for high aspect ratio structures, but development is still ongoing.

Cross-sectional scanning electron microscopy (SEM) is a low throughput, destructive technique that is not suitable for inline metrology. Atomic force microscopy (AFM) is limited in its ability to measure high aspect ratio structures and has relatively low throughput. CD-SAXS has not yet been demonstrated to achieve high throughput capabilities required by the semiconductor industry. Model based infrared reflectometry (MBIR) has been used for metrology of high aspect ratio DRAM structures, but the technique lacks the resolution provided by shorter wavelengths and the measurement spot sizes are too large for semiconductor metrology. See "Measuring deep-trench structures with model-based IR," by Gostein et al., Solid State Technology, vol. 49, no. 3, Mar. 1, 2006, which is incorporated by reference as if fully set forth herein.

Optical CD metrology currently lacks the ability to measure the detailed profile of structures with micron scale depths and lateral dimensions in a relatively small spot (e.g., less than 50 microns, or even more preferably, less than 30 microns) at high throughput. U.S. Pat. No. 8,860,937, which is incorporated by reference as if fully set forth herein, describes infrared spectroscopic ellipsometry techniques that are suitable for characterization of high aspect ratio structures. However, the described techniques suffer from long measurement times for measurements spanning the ultraviolet and infrared wavelengths, wavelength stability limitations, and limited range of infrared wavelengths during operation.

Existing metrology tools manufactured by KLA Corporation include the SpectraShape™ SS10k, SS11K, and S12k tools focused on critical dimension and shape metrology, and SpectraFilm™ F1-F20 tools focused on film metrology. These tools include a relatively large collection NA in the AOI direction, which limits sensitivity to deep structures having a relatively large number of layers, e.g., 200-300 layers. The existing tools have a relatively large collection NA in AOI direction and lack sensitivity at 200 to 300 layers NAND. In addition, the illumination wavelength range of existing tools is limited to 170 nanometers or higher because the tools employ refractive collection relay optics that are not compatible with shorter wavelength radiation.

In summary, ongoing reductions in feature size, increasing depths and layers of structural features, and increasing use of opaque material layers impose difficult requirements on optical metrology systems. Optical metrology systems must meet high precision and accuracy requirements for increasingly complex targets at high throughput to remain cost effective. In this context, collection NA and the limited short wavelength capability of collection relay optics have emerged as critical, performance limiting issues in the design of optical metrology systems suitable for high aspect ratio structures with a relatively large number of layers, e.g., over 200 layers. Thus, improved metrology systems and methods to overcome these limitations are desired.

SUMMARY

Methods and systems for performing spectroscopic ellipsometry measurements of semiconductor structures with reflective collection relay optics having demagnification from the spectrometer slit to the detector are presented herein. The demagnification effectively increases the NA at the detector and reduces the measurement spot size at the wafer imaged onto the detector. In this manner, the demagnification maintains high spectral resolution at the detector, particularly in the ultraviolet wavelength range, e.g., 120-400 nanometers, while maintaining a small collection NA at the wafer, e.g., collection NA less than 0.05. The small collection NA enables high fringe contrast, signal fidelity, and sensitivity, when measuring thick, multiple layer stacks, e.g., 200-300 layers.

In one aspect, the optical elements of collection relay optics 126 are reflective optical elements and the collection relay optics have a field demagnification greater than one, i.e., a field magnification less than one. In some embodiments, the field demagnification of collection relay optics is between 1.1× and 10×, i.e., a field magnification between 0.1× and 0.9×.

In general, reflective the collection relay optics may include any number of reflective optical elements configured with a field demagnification greater than one. Reflective collection relay optics with field demagnification greater than one improves the optical resolution at the detector(s) without adding chromatic aberrations inherent to refractive optical elements. In addition, reflective collection relay optics enable shorter wavelength collection light, e.g., wavelengths less than 190 nanometers. In some embodiments, reflective collection relay optics enable collection light having wavelengths in a range from 140 nanometers to 2,500 nanometers.

In some embodiments, the collection optics subsystem includes a collection mask disposed near a pupil of the collection optics subsystem. The collection mask includes one or more apertures, i.e., openings, configured to transmit collected light at one or more angles of incidence (AOIs) from the wafer, and block light from other AOIs. In some embodiments, a collection mask includes three apertures that transmit collected light from three different AOIs from the wafer. Furthermore, the collection mask is configured to transmit collected light at each of the one or more angles of incidence with a NA of less than 0.05 in the AOI direction. In some embodiments, the collection mask transmits collected light at each of the one or more angles of incidence with a NA in a range from 0.02 to 0.05 in the AOI direction. Sampling at a relatively small NA in the AOI direction enables high fringe contrast and sensitivity to thick films and HAR structures. In this manner the collection mask controls the NA of the collection subsystem.

A collection field stop controls the field of view of the collection optics subsystem. In some other embodiments, a spectrometer slit is employed to define the field of view of the collection optics subsystem.

In some embodiments, a dispersive element of a spectrometer includes one or more segments and each segment receives light from one or more corresponding apertures of the collection mask. In this manner, light dispersed by a dispersive element onto a detector includes light corresponding to one or more discrete angles of incidence at the wafer.

In general, a detector receives light collected from a wafer at one or more angles of incidence, multiple wavelengths, and one or more polarization states. The detector generates output signals responsive to light collected from the one or more structures illuminated by the illumination subsystem. In some embodiments, the dispersive element linearly disperses diffracted light according to wavelength along one dimension of a detector causing a spatial separation among different wavelengths of light projected onto the surface of the detector. In this manner, light collected from a measurement spot at a particular wavelength is projected onto the detector at a spatial location that is different from light collected from the measurement spot at another, different wavelength.

In another aspect, the methods and systems for spectroscopic metrology of semiconductor devices described herein are applied to the measurement of high aspect ratio (HAR) structures, large lateral dimension structures, or both. The described embodiments enable optical critical dimension (CD), film, and composition metrology for semiconductor devices including three dimensional NAND structures, such as vertical-NAND (V-NAND) structures, dynamic random access memory structures (DRAM), etc., manufactured by various semiconductor manufacturers such as Samsung Inc. (South Korea), SK Hynix Inc. (South Korea), Toshiba Corporation (Japan), and Micron Technology, Inc. (United States), etc. These complex devices suffer from low light penetration into the structure(s) being measured. FIG. 3 depicts an exemplary high aspect ratio structure 160 that suffers from low light penetration into the structure(s) being measured. A spectroscopic ellipsometer with broadband capability and wide ranges of AOI, azimuth angle, or both, having simultaneous spectral band detection as described herein is suitable for measurements of these high-aspect ratio structures. HAR structures often include hard mask layers to facilitate etch processes for HARs. As described herein, the term "HAR structure" refers to any structure characterized by an aspect ratio that exceeds 2:1 or 10:1, and may be as high as 100:1, or higher.

The foregoing is a summary and thus contains, by necessity, simplifications, generalizations and omissions of detail; consequently, those skilled in the art will appreciate that the summary is illustrative only and is not limiting in any way. Other aspects, inventive features, and advantages of the devices and/or processes described herein will become apparent in the non-limiting detailed description set forth herein.

DETAILED DESCRIPTION

Reference will now be made in detail to background examples and some embodiments of the invention, examples of which are illustrated in the accompanying drawings.

Methods and systems for performing spectroscopic ellipsometry measurements of semiconductor structures with reflective collection relay optics having demagnification from the spectrometer slit to the detector are presented herein. The demagnification effectively increases the NA at the detector and reduces the measurement spot size at the wafer that is imaged onto the detector. In this manner, the demagnification maintains high spectral resolution at the detector, particularly in the ultraviolet wavelength range, e.g., 120-400 nanometers, while maintaining a small collection NA at the wafer, e.g., collection NA less than 0.05. The small collection NA enables high fringe contrast, signal fidelity, and sensitivity, when measuring thick, multiple layer stacks, e.g., 200-300 layers.

Figure 1:
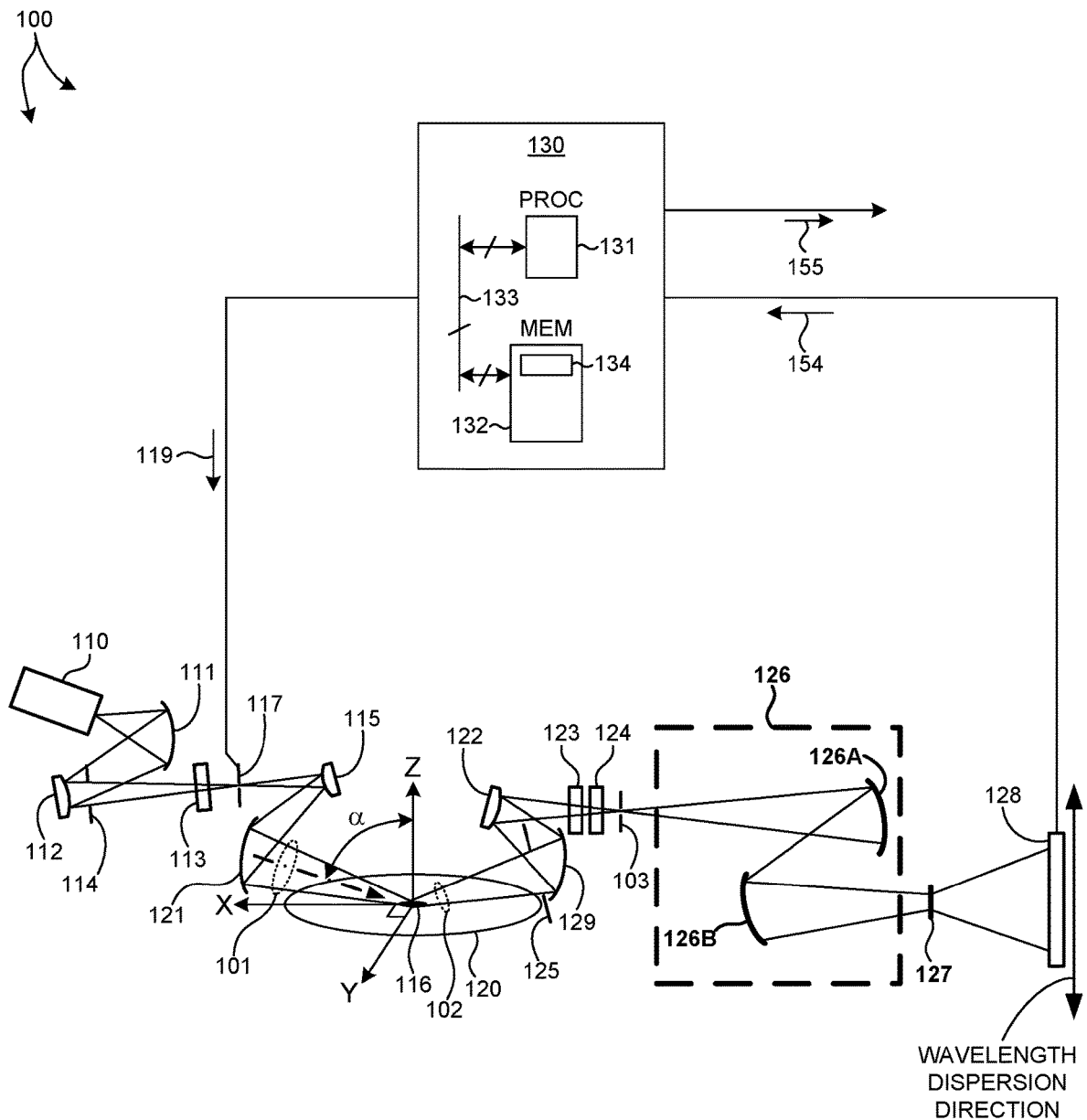
FIG. 1 depicts an exemplary metrology system 100 for performing broadband spectroscopic measurements of semiconductor structures with collection relay optics having demagnification greater than one as described herein.

FIG. 1 depicts an exemplary, metrology system 100 for performing broadband spectroscopic measurements of semiconductor structures (e.g., film thickness, critical dimensions, overlay, etc.). In some examples, the one or more structures include at least one high aspect ratio (HAR) structure or at least one large lateral dimension structure. In some of these examples, the one or more structures include at least 200 different layers. As depicted in FIG. 1, metrology system 100 is configured as an oblique incidence, broadband spectroscopic ellipsometer. However, in general, metrology system 100 may also include additional spectroscopic ellipsometers, a spectroscopic reflectometer, scatterometer, or any combination thereof.

Metrology system 100 includes an illumination source 110 that generates a beam of illumination light 101 incident on a wafer 120. Illumination source 110 includes one or more illumination sources that emit illumination light including wavelengths in a range from 140 nanometers to 2,500 nanometers. In some embodiments, illumination source 110 is a combined illumination source that emits illumination light in the ultraviolet, visible, and infrared spectra, including ultraviolet wavelengths down to 140 nanometers and infrared wavelengths greater than two micrometers, e.g., illumination wavelengths ranging from 140 nanometers to 2,500 nanometers. In some other embodiments, illumination source 110 is a combined illumination source that emits illumination light including wavelengths in a range from 140 nanometers to 7,000 nanometers.

In a preferred embodiment, combined illumination source 110 includes a supercontinuum laser source and a laser sustained plasma light source. The supercontinuum laser source provides illumination at wavelengths greater than two micrometers, and in some embodiments, up to 5 micrometers, or more. The laser sustained plasma (LSP) light source (a.k.a., laser driven plasma source) produces photons across the entire wavelength range from 120 nanometers to 2500 nanometers and beyond. The pump laser of the LSP light source may be continuous wave or pulsed. In some embodiments, combined illumination source 110 includes a supercontinuum laser source and an arc lamp, such as a Xenon arc lamp. However, a laser-driven plasma source produces significantly more photons than a Xenon lamp across the entire wavelength range from 120 nanometers to 2500 nanometers, and is therefore preferred.

In general, combined illumination source 110 includes a combination of a plurality of broadband or discrete wavelength light sources. The light generated by combined illumination source 110 includes a continuous spectrum or parts of a continuous spectrum, from ultraviolet to infrared (e.g., vacuum ultraviolet to long infrared). In general, combined illumination light source 110 may include a supercontinuum laser source, an infrared helium-neon laser source, a silicon carbide globar light source, a tungsten halogen light source, one or more infrared LEDs, one or more infrared lasers or any other suitable infrared light source generating wavelengths greater than two micrometers, and an arc lamp (e.g., a Xenon arc lamp), a deuterium lamp, a LSP light source, or any other suitable light source generating wavelengths less than two micrometers including visible and ultraviolet wavelengths.

In general, combined illumination source 110 includes multiple illumination sources optically coupled in any suitable manner. In some embodiments, light emitted by a supercontinuum laser source is directly coupled through the plasma generated by the ultraviolet/visible light source.

Figure 2:
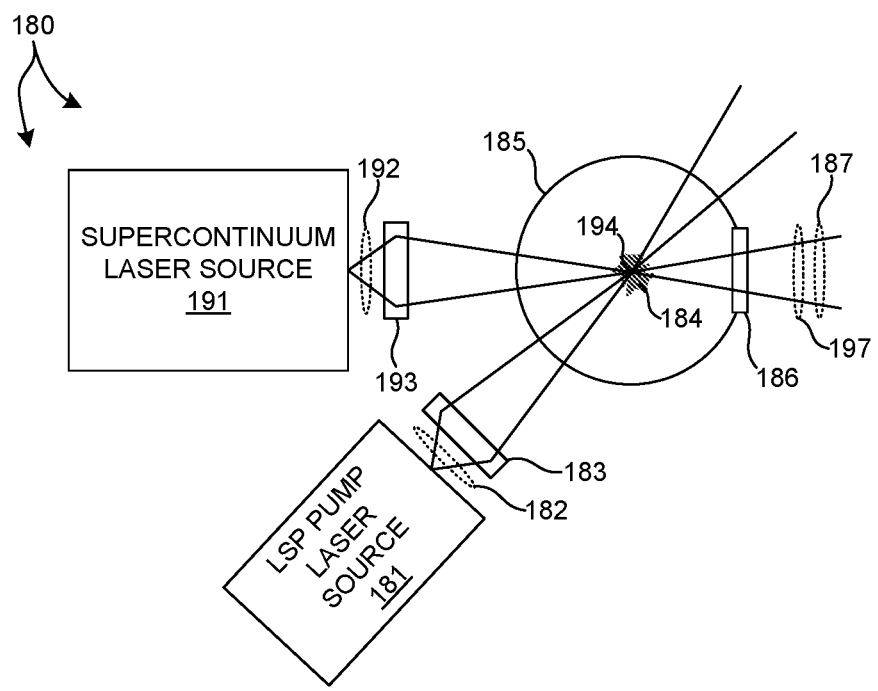
FIG. 2 depicts an embodiment 180 of a combined illumination source.

FIG. 2 depicts an embodiment 180 of a combined illumination source 110. As depicted in FIG. 2, a LSP pump laser source 181 generates pump light 182 that is focused by focusing optics 183 to sustain a plasma 184 contained by bulb 185. Plasma 184 generates broadband spectrum light over a wavelength range of ultra-violet to short infrared. Bulb 185 includes an exit port 186. LSP output light 187 is the portion of light from plasma 184 that passes through exit port 186 and is directed towards the illumination optics subsystem as described with reference to FIG. 1. In addition, supercontinuum laser source 191 generates infrared light 192 that is focused by focusing optics 193 to a focus 194 at or near plasma 184. Supercontinuum output light 197 is the portion of light from the focus 194 that passes through exit port 186 and is directed towards the illumination subsystem as described with reference to FIG. 1. In one example, the LSP output light 187 and supercontinuum output light 197 are co-located. In this manner, infrared light 197 from supercontinuum source 191 is effectively combined with ultraviolet/visible light 187 from LSP laser source 181. In one example, LSP output light 187 and supercontinuum output light 197 have the same or similar numerical aperture. In another example, LSP output light 187 and supercontinuum output light 197 have different numerical aperture. In some examples, bulb 185 is constructed from Calcium Fluoride or Magnesium Fluoride to transmit wavelengths above 2.5 micrometers generated by supercontinuum laser source 191. In some other examples, bulb 185 includes one or more exit ports 186 fabricated from Calcium Fluoride or Magnesium Fluoride to transmit wavelengths above 2.5 micrometers generated by supercontinuum laser source 191. A conventional bulb constructed from fused silica does not transmit significant light above 2.5 micrometers, and is thus unsuitable for combining light generated by the supercontinuum laser source 191 in the manner described herein. In some embodiments, the LSP pump laser source 181 is a continuous wave laser. In some other embodiments, the LSP pump laser source 181 is a pulsed laser.

As depicted in FIG. 1, metrology system 100 includes an illumination subsystem configured to direct illumination light 101 to one or more structures formed on the wafer 120. The illumination subsystem may include any type and arrangement of optical filter(s), polarizing component, field stop, pupil stop, etc., known in the art of spectroscopic metrology. As depicted in FIG. 1, the illumination subsystem includes light source 110, beam shaping optics 111, 112, 115, and 121, polarizing component 113, and pupil stop 114. As depicted, in FIG. 1, the beam of illumination light 101 is reflected from beam shaping optics 111, 112, 115, and 121 and passes through polarizing component 113 and pupil stop 114 as the beam propagates from the illumination source 110 to wafer 120. Beam 101 illuminates a portion of wafer 120 over a measurement spot 116.

In the embodiment depicted in FIG. 1, pupil stop 114 controls the numerical aperture (NA) of the illumination subsystem and may include any suitable commercially available aperture stop. In one aspect, the illumination subsystem is configured to direct illumination light 101 to wafer 120 with an illumination Numerical Aperture (NA) of at least 0.1, e.g., between 0.1 and 0.25, at the wafer surface. In one aspect, the illumination NA provides an illumination spot at wafer 120 that fits within a scribe line. This enables measurements of scribe line metrology targets. In some embodiments, illumination light 101 is focused on a 50 micrometer by 50 micrometer scribe line target area. In some embodiments, illumination light 101 is focused on a 50 micrometer by 100 micrometer scribe line target area. In some embodiments, illumination light 101 is focused on a 50 micrometer by 150 micrometer scribe line target area. In some embodiments, illumination light 101 is incident at wafer 120 at an angle of incidence, a, at or near 65 degrees from normal incidence.

In addition, the illumination subsystem may include filters, masks, apodizers, etc. For example, the illumination subsystem may include an illumination field stop (not shown) and one or more optical filters (not shown). The illumination field stop controls the field of view (FOV) of the illumination subsystem and may include any suitable commercially available field stop. The optical filters are employed to control light level, spectral output, or both, from the illumination subsystem. In some examples, one or more multi-zone filters are employed as optical filters. As depicted in FIG. 1, beam shaping optics 111, 112, 115, and 121, include one or more optical elements having reflective focusing power.

In some examples, the beam size of the amount of illumination light 101 projected onto the surface of wafer 120 is smaller than a size of a measurement target that is measured on the surface of the specimen. Exemplary beam shaping techniques are described in detail in U.S. Patent Application Publication No. 2013/0114085 by Wang et al., the contents of which are incorporated herein by reference in their entirety.

In some examples, noise and polarization optimization are performed to improve the performance of illumination source 110. In some examples, depolarization is achieved by use of multimode fibers, a Hanle depolarizer, or an integration sphere. In some examples, the illumination source etendue is optimized by use of light guides, fibers, and other optical elements (e.g., lenses, curved mirrors, apodizers, etc.). In some examples, source coherence or coherence effects are mitigated by coherence breaking techniques, or are otherwise accounted for by modeling and simulation.

Polarizing component 113 generates the desired polarization state exiting the illumination subsystem. In some embodiments, the polarizing component includes a polarizer, a compensator, or both, and may include any suitable commercially available polarizing component. The polarizer, compensator, or both, can be fixed, rotatable to different fixed positions, or continuously rotatable. Although the illumination subsystem depicted in FIG. 1 includes one polarizing component, the illumination subsystem may include more than one polarizing component. In some embodiments, a polarizer of polarizing component 113 is a Magnesium Fluoride Rochon polarizer. In some embodiments, a compensator of polarizing component 113 includes a quartz waveplate, a Magnesium Fluoride waveplate, a Calcium Fluoride K-prism, a Calcium Fluoride double Fresnel rhomb, or any combination thereof. In some embodiments, a compensator of polarizing component 113 includes one or more waveplates. In some of these embodiments, a first waveplate includes a desired retardation over a first wavelength range and a second waveplate includes a desired retardation over a second wavelength range, etc.

Metrology system 100 also includes a collection optics subsystem configured to collect light generated by the interaction between the one or more structures and the incident illumination beam 101 and focus the collected light at or near a dispersive element, e.g., a spectrometer slit, of a spectrometer. The collection optics subsystem may include any type and arrangement of optical filter(s), polarizing component, field stop, pupil stop, etc., known in the art of spectroscopic metrology. In general, a collection optics subsystem includes a field stop, a pupil mask, and one or more optical elements having reflective focusing power.

As depicted in FIG. 1, a beam of collected light 102 is collected from measurement spot 116 by a collection subsystem. Collected light 102 is reflected from beam shaping optics 129 and 122 and elements of reflective collection relay optics 126, and passes through compensator 123, analyzer 124, collection mask 125, and collection field stop 103 of the collection optics subsystem as the beam of collection light 102 propagates from wafer 120 to dispersive element 127 of the spectrometer.

As depicted in FIG. 1, the collection optics subsystem includes a polarizing component that analyzes the polarization state of the collected light. In some embodiments, the polarizing component includes an analyzer, a compensator, or both, and may include any suitable commercially available polarizing component. The analyzer, compensator, or both, can be fixed, rotatable to different fixed positions, or continuously rotatable. The collection subsystem depicted in FIG. 1 includes a compensator 123 and an analyzer 124. In general, a collection optics subsystem may include any number of polarizing elements.

In some embodiments, compensator 123 includes a quartz waveplate, a Magnesium Fluoride waveplate, a Calcium Fluoride K-prism, a Calcium Fluoride double Fresnel rhomb, or any combination thereof. In some embodiments, compensator 123 includes one or more waveplates. In some of these embodiments, a first waveplate includes a desired retardation over a first wavelength range and a second waveplate includes a desired retardation over a second wavelength range, etc. In some embodiments, analyzer 124 is a Magnesium Fluoride Rochon analyzer.

As depicted in FIG. 1, the collection optics subsystem includes a collection mask 125 disposed near a pupil of the collection optics subsystem. Collection mask 125 includes one or more apertures, i.e., openings, configured to transmit collected light at one or more angles of incidence (AOIs) from wafer 120, and block light from other AOIs. In some embodiments, collection mask 125 includes three apertures that transmit collected light from three different AOIs from wafer 120. Furthermore, collection mask 125 is configured to transmit collected light at each of the one or more angles of incidence with a NA of less than 0.05 in the AOI direction. In some embodiments, collection mask 125 transmits collected light at each of the one or more angles of incidence with a NA in a range from 0.02 to 0.05 in the AOI direction. Sampling at a relatively small NA in the AOI direction enables high fringe contrast and sensitivity to thick films and HAR structures. In this manner collection mask 125 controls the NA of the collection subsystem.

Collection field stop 103 controls the field of view of the collection optics subsystem. In some other embodiments, a spectrometer slit is employed to define the field of view of the collection optics subsystem.

In the embodiment depicted in FIG. 1, a spectrometer subsystem includes the collection field stop 103, dispersive element 127, and one or more optics having reflective focusing power (not shown). The collection field stop 103 receives light from the collection optics subsystem including relay optics 126, and transmits a portion of the collected light to dispersive element 127. Dispersive element 127 disperses the light into discrete wavelengths on the active surface of detector 128.

Dispersive element 127 is typically located at or near a pupil plane of the collection optics subsystem. Relay optics 126 receives light from collection mask 125 and images the light from collection mask 125 to the pupil plane at or near dispersive element 127. In this manner, collection relay optics 126 functions as a pupil relay and images the collection mask 125 at dispersive element 127.

In one aspect, the optical elements of collection relay optics 126 are reflective optical elements and the collection relay optics 126 have a field demagnification greater than one, i.e., a field magnification less than one. The demagnification of the collection relay optics enables higher NA and spectral resolution at detector 128. In some embodiments, the field demagnification of collection relay optics 126 is between 1.1× and 10×, i.e., a field magnification between 0.1× and 0.9×. In some embodiments, the field demagnification of collection relay optics 126 is between 2× and 10×, i.e., a field magnification between 0.1× and 0.5×. As described herein, the field magnification of the collection relay optics is the input NA over the output NA of the relay optics in imaging space, and the field demagnification of the collection relay optics is the output NA over the input NA of the relay optics in imaging space.

As depicted in FIG. 1, reflective collection relay optics 126 includes reflective optical elements 126A and 126B. However, in general, reflective collection relay optics 126 may include any number of reflective optical elements configured with a field demagnification greater than one. Reflective collection relay optics with field demagnification greater than one improves the optical resolution at the detector(s) without adding chromatic aberrations inherent to refractive optical elements. The increased spectral resolution offsets the loss of spectral resolution at the detector caused by using a collection mask with a relatively small NA at the wafer, i.e., less than 0.05. In addition, reflective collection relay optics enable shorter wavelength collection light, e.g., wavelengths less than 190 nanometers. In some embodiments, reflective collection relay optics enable collection light having wavelengths in a range from 140 nanometers to 2,500 nanometers.

Dispersive element 127 is typically a diffraction grating or a dispersive prism. In some embodiments, dispersive element 127 includes one or more segments and each segment receives light from one or more corresponding apertures of collection mask 125. In this manner, light dispersed by dispersive element 127 includes light corresponding to one or more discrete angles of incidence at the wafer. In some embodiments, dispersive element 127 is a planar diffraction grating. In some of these embodiments, the planar diffraction grating is segmented to split the pupil into segments each corresponding to a different set of discrete angles of incidence at the wafer. Further details regarding pupil splitting are described in U.S. Pat. No. 10,690,602 to KLA-Tencor Corporation, the content of which is incorporated herein by reference in its entirety.

As depicted in FIG. 1, detector 128 receives light collected from wafer 120 at one or more angles of incidence, multiple wavelengths, e.g., 140 nanometers to 2,500 nanometers, and one or more polarization states. In the embodiment depicted in FIG. 1, the collection optics subsystem directs light to detector 128 and the detector 128 generates output signals 154 responsive to light collected from the one or more structures illuminated by the illumination subsystem. The dispersive element 127 linearly disperses diffracted light according to wavelength along one dimension of detector 128 (i.e., the wavelength dispersion direction noted in FIG. 1). Dispersive element 127 causes a spatial separation among different wavelengths of light projected onto the surface of detector 128. In this manner, light collected from measurement spot 116 having a particular wavelength is projected onto detector 128 at a spatial location that is different from light collected from measurement spot 116 having another, different wavelength.

Metrology system 100 also includes computing system 130 configured to receive detected signals 154 and determines an estimate 155 of a value of a parameter of interest of the measured structure(s) based on the detected signals.

In general, a collection optics subsystem may direct light to more than one detector. In these embodiments, two or more detectors are each configured to detect collected light over different wavelength ranges, simultaneously.

In one example, one detector is a charge coupled device (CCD) sensitive to ultraviolet and visible light (e.g., light having wavelengths between 190 nanometers and 860 nanometers), and another detector is a photo detector array (PDA) sensitive to infrared light (e.g., light having wavelengths between 950 nanometers and 5000 nanometers). However, in general, other two dimensional detector technologies may be contemplated (e.g., a position sensitive detector (PSD), an infrared detector, a photovoltaic detector, etc.). Each detector converts the incident light into electrical signals indicative of the spectral intensity of the incident light. In some embodiments, the detection subsystem is arranged such that the collected light propagates to all detectors of metrology system 100, simultaneously. By simultaneously collecting UV and IR spectra, measurement times are reduced and all spectra are measured with the same alignment conditions. This allows wavelength errors to be corrected more easily because a common correction can be applied to all spectral data sets.

In general, dispersive element 127 may be configured to subdivide the incident light into different wavelength bands, propagate the different wavelength bands in different directions, and disperse the light of one of the wavelength bands onto one or more detectors in any suitable manner. In one example, dispersive element 127 is configured as a transmissive grating. In some other examples, dispersive element 127 includes a beamsplitting element to subdivide the beam into different wavelength bands and a reflective or transmissive grating structure to disperse one of the wavelength bands onto a detector.

In some embodiments, dispersive element 127 is a reflective grating configured to diffract a subset of wavelengths of the incident light into the +/−1 diffraction order toward one detector and diffract a different subset of wavelengths of the incident light into the zero diffraction order toward another detector.

By measuring a target with infrared, visible, and ultraviolet light in a single system, precise characterization of complex three dimensional structures is enabled. In general, relatively long wavelengths penetrate deep into a structure and provide suppression of high diffraction orders when measuring structures with relatively large pitch. Relatively short wavelengths provide precise dimensional information about structures such as relatively small CD and roughness features. In some examples, longer wavelengths enable measurement of dimensional characteristics of targets with relatively rough surfaces or interfaces due to lower sensitivity of longer wavelengths to roughness. In general, measuring a target with infrared, visible, and ultraviolet light in a single system improves sensitivity to some measurement parameters and reduces correlations among parameters (e.g., parameters characterizing top and bottom layers).

In some embodiments, the methods and systems for spectroscopic metrology of semiconductor devices described herein are applied to the measurement of high aspect ratio (HAR), large lateral dimension structures, opaque film layers, or a combination thereof. These embodiments enable optical critical dimension (CD), film, and composition metrology for semiconductor devices with HAR structures (e.g., NAND, VNAND, TCAT, DRAM, etc.) and, more generally, for complex devices that suffer from low light penetration into the structure(s) being measured. HAR structures often include hard mask layers to facilitate etch processes for HARs. As described herein, the term "HAR structure" refers to any structure characterized by an aspect ratio that exceeds 2:1 or 10:1, and may be as high as 100:1, or higher.

Figure 3:
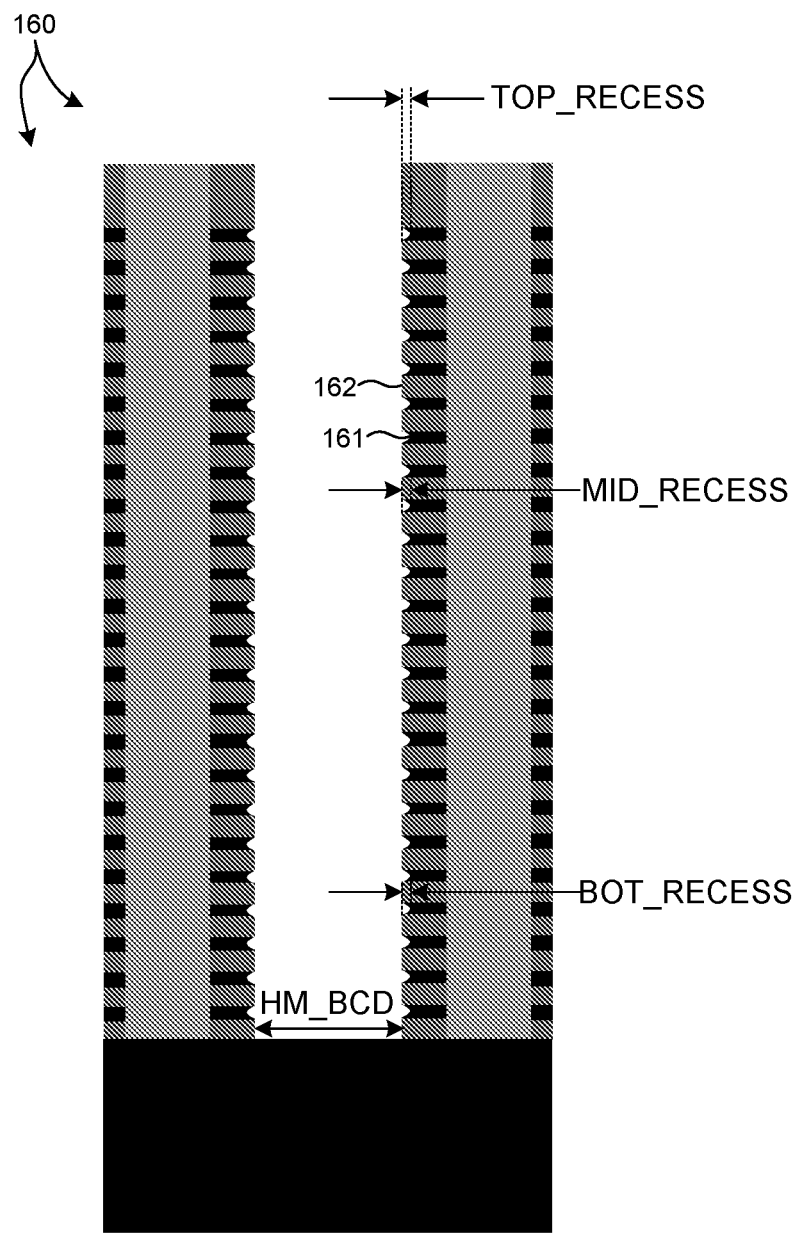
FIG. 3 depicts an exemplary high aspect ratio semiconductor structure 160 that suffers from low light penetration into the structure(s) being measured.

FIG. 3 depicts a vertically integrated memory structure 160 including tungsten layers 161 sandwiched between oxide layers 162. As depicted in FIG. 3, the etching process leaves behind a horizontal recess in each tungsten layer 161 relative to oxide layers 162 above and below each tungsten layer 161. The tungsten recess at or near the top of structure 160 is referred to as a top recess. The tungsten recess at or near the middle of structure 160 is referred to as a mid_recess. The tungsten recess at or near the bottom of structure 160 is referred to as a bot_recess. The opening of the oxide layer 162 at or near the bottom of structure 160 is referred to as the bottom critical dimension (HM_BCD).

In some embodiments, a spectroscopic measurement system includes a combined illumination source including a first illumination source that generates ultraviolet, visible, and near infrared wavelengths (e.g., wavelengths less than two micrometers) and a second illumination source that generates mid infrared and long infrared wavelengths (e.g., wavelengths of two micrometers and greater). In some examples, the combined illumination source generates illumination light having wavelengths down to 140 nanometers. In some examples, the combined illumination source generates illumination light having wavelengths up to and including 4.2 micrometers. In some examples, the combined illumination source generates illumination light having wavelengths up to and including 5 micrometers. In some examples, the combined illumination source generates illumination light having wavelengths that exceed 5 micrometers. Furthermore, the spectroscopic measurement system includes one or more measurement channels spanning the range of illumination wavelengths employed to perform measurements of semiconductor structures. The one or more measurement channels are operable in parallel (i.e., simultaneous measurement of the sample throughout the wavelength range) or in sequence (i.e., sequential measurement of the sample throughout the wavelength range).

Figure 4A:
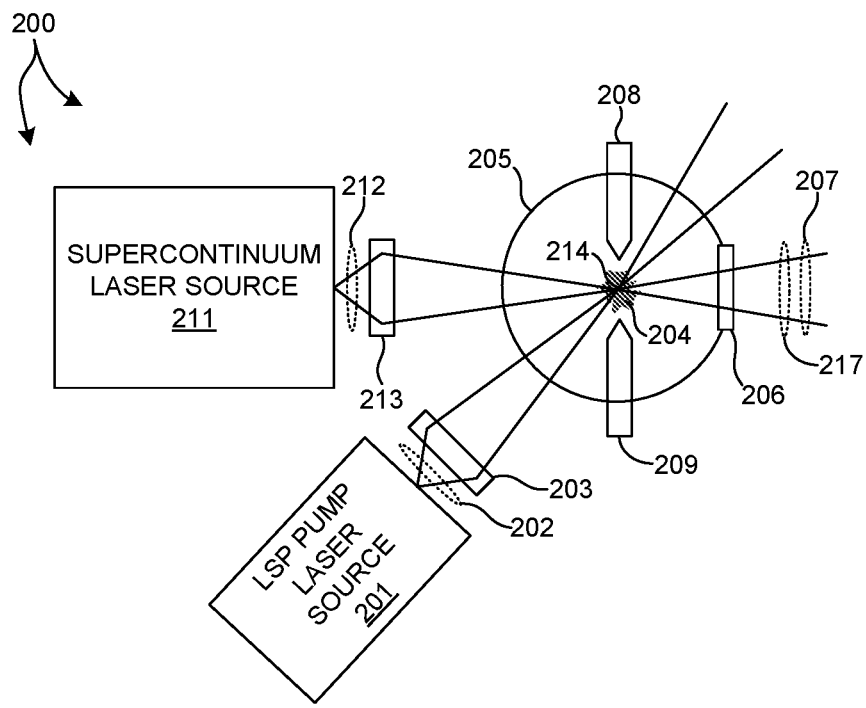
FIG. 4A depicts another embodiment 200 of a combined illumination source.

FIG. 4A depicts an embodiment 200 of a combined illumination source 110. As depicted in FIG. 4A, a voltage provided across a cathode 208 and an anode 209 generates a plasma 204 contained by bulb 205. In addition, a LSP pump laser source 201 generates pump light 202 that is focused by focusing optics 203 to sustain plasma 204 contained by bulb 205. Plasma 204 generates broadband spectrum light over a wavelength range of ultra-violet to short infrared. Ultraviolet/visible/short infrared light 207 generated by plasma 204 is provided to the illumination optics subsystem as described with reference to FIG. 1. In addition, supercontinuum laser source 211 generates infrared light 212. Infrared light 212 is focused by focusing lens 213 and forms a focus 214 at or near plasma 204. Infrared light 217 from focus 214 is provided to the illumination optics subsystem as described with reference to FIG. 1. In one example, UV/visible/short infrared light 207 and infrared light 217 are co-located and are effectively combined. In some examples, bulb 205 is constructed from Calcium Fluoride or Magnesium Fluoride to transmit wavelengths above 2.5 micrometers generated by supercontinuum laser source 211. In some other examples, bulb 205 includes one or more exit ports 206 fabricated from Calcium Fluoride or Magnesium Fluoride to transmit wavelengths above 2.5 micrometers generated by supercontinuum laser source 211. A conventional bulb constructed from fused silica does not transmit significant light above 2.5 micrometers, and is thus unsuitable for combining light generated by the supercontinuum laser illumination source 211 in the manner described herein.

Figure 4B:
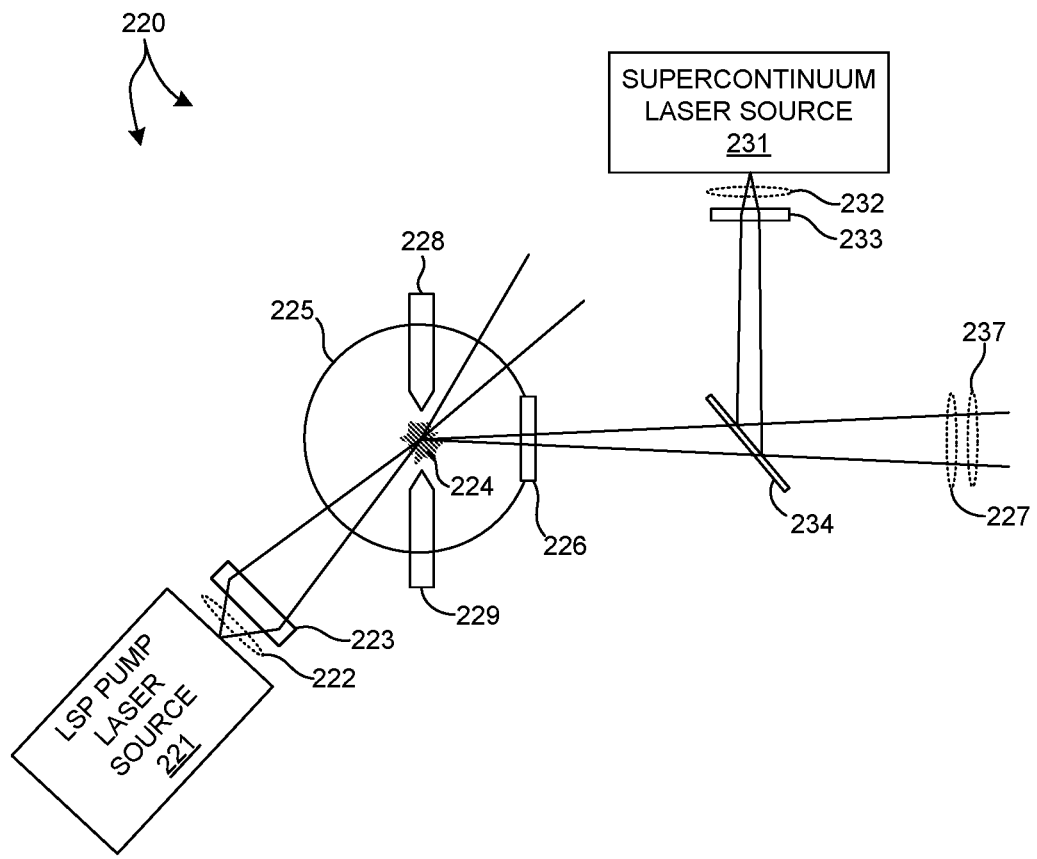
FIG. 4B depicts another embodiment 220 of a combined illumination source.

FIG. 4B depicts an embodiment 220 of a combined illumination source 110. As depicted in FIG. 4B, a voltage provided across a cathode 228 and an anode 229 generates a plasma 224 contained by bulb 225. In addition, a LSP pump laser source 221 generates pump light 222 that is focused by focusing optics 223 to sustain plasma 224 contained by bulb 225. Plasma 224 generates broadband spectrum light over a wavelength range of ultra-violet to short infrared. Ultraviolet/visible/short infrared light 227 generated by plasma 224 exits bulb 225 through exit port 226 and is provided to the illumination optics subsystem as described with reference to FIG. 1. In addition, supercontinuum laser source 231 generates infrared light 232. Infrared light 232 is focused by focusing lens 233. Infrared light 237 from supercontinuum laser source 231 is provided to the illumination optics subsystem as described with reference to FIG. 1.

As depicted in FIG. 4B, UV/visible/short infrared light 227 and infrared light 237 are combined by beam combiner 234. As such, beam combiner 234 combines light generated by an ultraviolet light source 221 (e.g., LSP light source 221) with light generated by an infrared light source 231 (e.g., supercontinuum laser light source 231). In one example, the beam combiner 234 has a splitting wavelength, for example, at or near 900 nanometers. The beam combiner minimizes loss of light generated by the LSP light source (LSP loss less than 10%) and minimizes depolarization effects (e.g., less than 0.1%) across all illumination wavelengths.

Figure 4C:
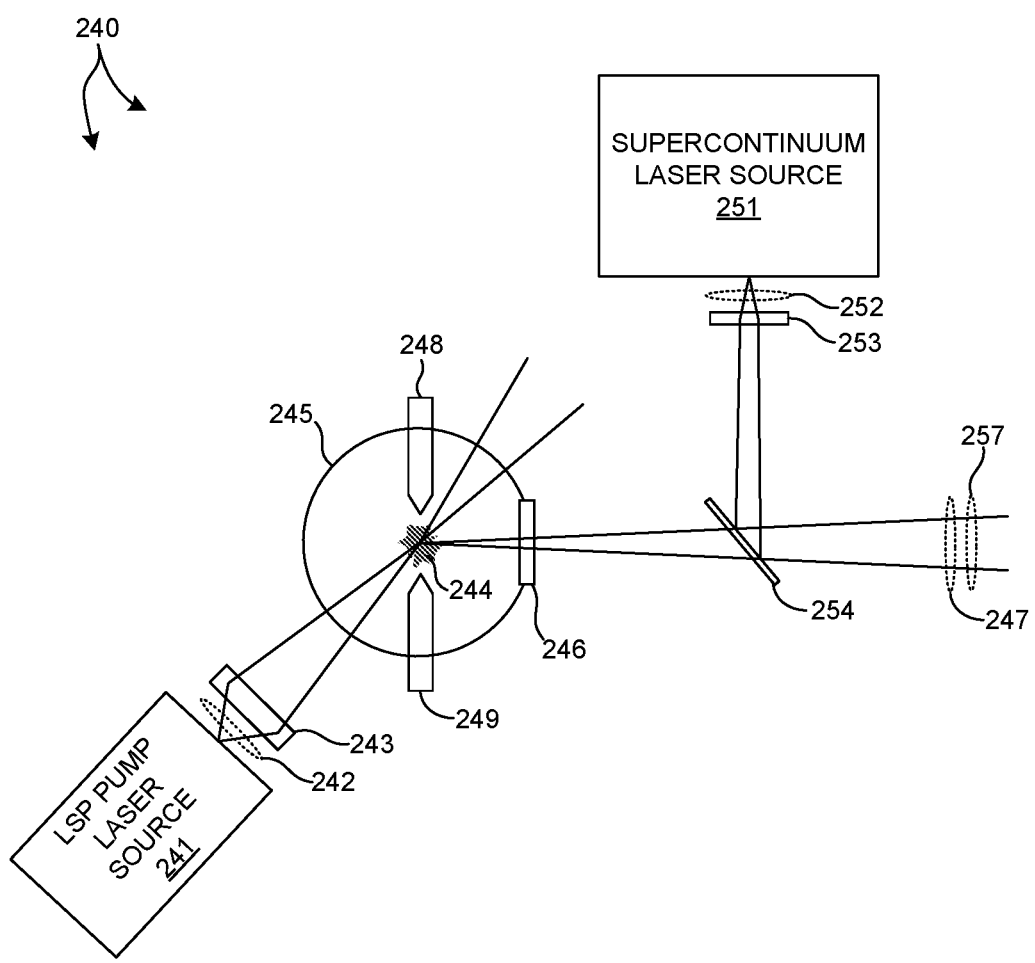
FIG. 4C depicts another embodiment 240 of a combined illumination source.

FIG. 4C depicts an embodiment 240 of a combined illumination source 110. As depicted in FIG. 4C, a voltage provided across a cathode 248 and an anode 249 generates a plasma 244 contained by bulb 245. In addition, a LSP pump laser source 241 generates pump light 242 that is focused by focusing optics 243 to sustain plasma 244 contained by bulb 245. Plasma 244 generates broadband spectrum light over a wavelength range of ultra-violet to short infrared. Ultraviolet/visible/short infrared light 247 generated by plasma 244 exits bulb 245 through exit port 246 and is provided to the illumination optics subsystem as described with reference to FIG. 1. In addition, supercontinuum laser source 251 generates infrared light 252. Infrared light 252 is focused by focusing lens 253. Infrared light 257 from supercontinuum laser source 251 is provided to the illumination optics subsystem as described with reference to FIG. 1.

As depicted in FIG. 4C combined illumination source 110 provides ultraviolet and infrared illumination light to wafer 120 selectively. In these examples, the measurement is time multiplexed. Mirror 254 is a moveable mirror. In one example, moveable mirror 254 is mounted to a galvanometer employed to selectively direct ultraviolet/visible light 247 and infrared light 257 to wafer 120 based on whether moveable mirror 254 is locating in or out of the optical path of ultraviolet/visible light 247. In another example, a moveable total internal reflection prism is employed to selectively direct ultraviolet/visible light 247 and infrared light 257 to wafer 120. In this manner, spectral measurements including ultraviolet/visible spectra are performed at a different time than spectral measurements including infrared spectra.

Figure 5:
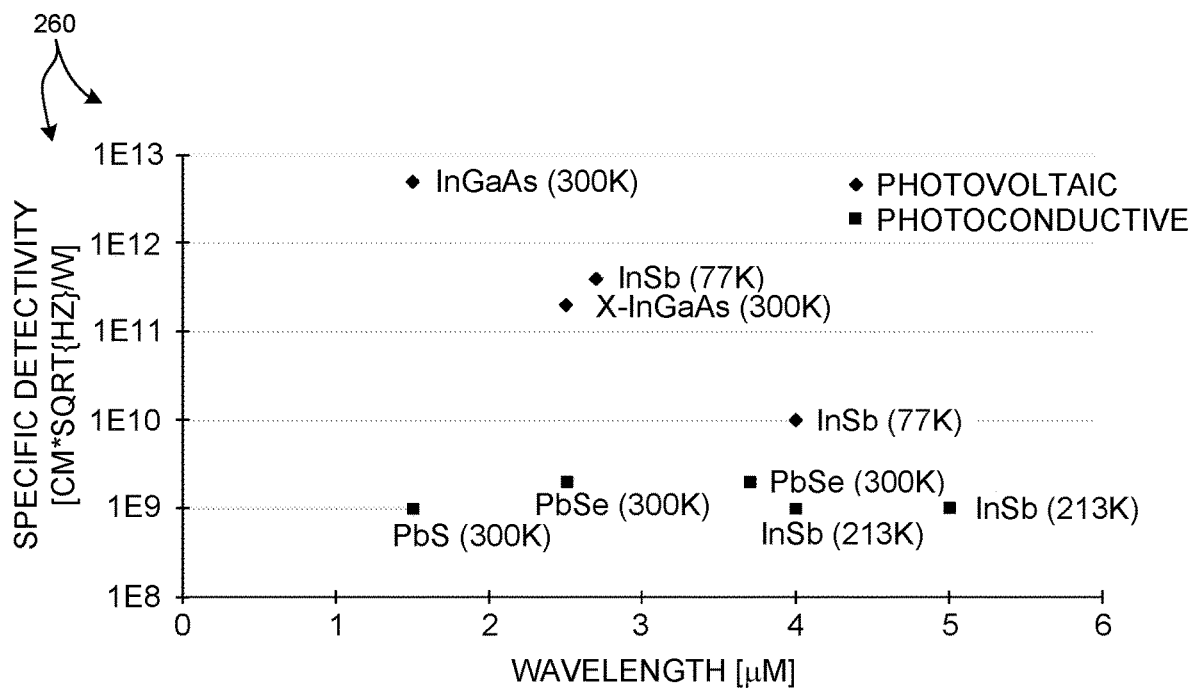
FIG. 5 depicts a plot illustrative of the specific detectivity of various detector technologies operating at specified temperatures.

FIG. 5 depicts a plot 260 illustrative of the specific detectivity of various detector technologies operating at specified temperatures. As illustrated in FIG. 5, both photovoltaic and photoconductive detector technologies are suitable for detecting radiation at infrared wavelengths exceeding one micrometer, and up to five micrometers. In some examples, metrology system 100 include detectors such as lead sulfide (PbS), lead selenide (PbSe), indium antimonide (InSb), indium arsenide (InAs), mercury cadmium telluride (HgCdTe), indium gallium arsenide (InGaAs), x-InGaAs, pyroelectric, and bolometric detectors.

Pyroelectric and bolometric detectors are not quantum detectors. Thus, these detectors may accept high light levels without saturation, and thus reduce noise sensitivity.

In some embodiments, the detector subsystem is shot noise limited, rather than dark noise limited. In these examples, it is preferred to perform multiple measurements at high light levels to reduce measurement system noise.

In some embodiments, a time dependent measurement (e.g., pulsed light source, chopper, etc.) is performed in coordination with a lock-in amplifier or other phase locked loop to increase the measurement signal to noise ratio.

In some embodiments, one or more of the detectors are cooled to temperatures of −20° C., 210° K, 77° K, or other low temperature to reduce measurement noise. In general, any suitable cooling element may be employed to maintain the temperature of a detector at a constant temperature during operation. By way of non-limiting example, any of a multi stage Peltier cooler, rotating disc cooler, Stirling cycle cooler, N2 cooler, He cooler, etc. may be contemplated within the scope of this patent document.

In some embodiments, a broad range of wavelengths are detected by a detector that includes multiple photosensitive areas having different sensitivity characteristics. Collected light is linearly dispersed across the surface of the detector according to wavelength. Each different photosensitive area is arranged on the detector to sense a different range of incident wavelengths. In this manner, a broad range of wavelengths are detected with high signal to noise ratio by a single detector. These features, individually, or in combination, enable high throughput measurements of high aspect ratio structures (e.g., structures having depths of one micrometer or more) with high throughput, precision, and accuracy.

In some embodiments, a detector subsystem includes a multi-zone infrared detector that combines different sensitivity bands at different locations on a single detector package. The detector is configured to deliver a continuous spectrum of data at different sensitivities, depending on location of incidence.

Figure 7:
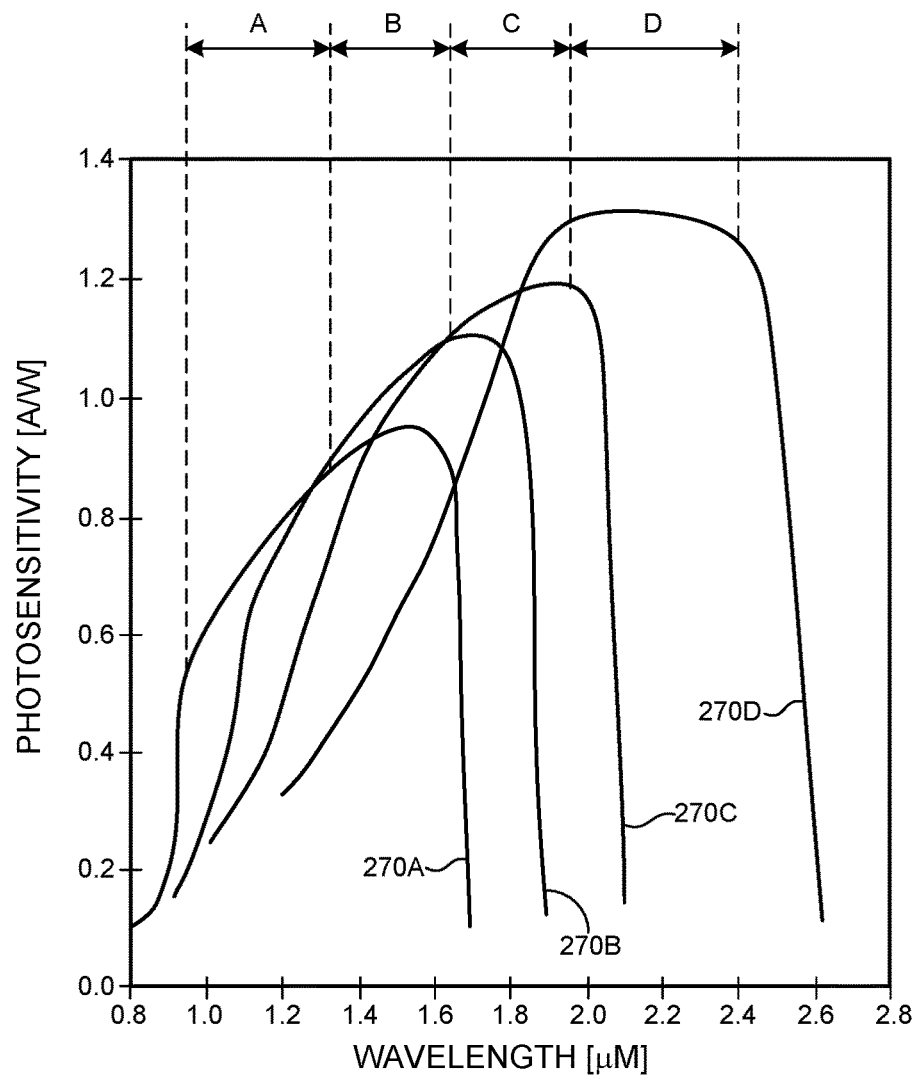
FIG. 7 illustrates typical photosensitivity curves of four available Indium Gallium Arsenide (InGaAs) sensors.

FIG. 7 illustrates typical photosensitivity curves of available Indium Gallium Arsenide (InGaAs) sensors. As depicted in FIG. 7, no single sensor of the available InGaAs sensors is capable of providing adequate photosensitivity across a wavelength band from 1 micrometer to 2.5 micrometers. Thus, individually, the available sensors are only capable of sensing over a narrow waveband.

In some embodiments, multiple sensor chips, each sensitive in a different waveband are combined into a single detector package. In turn, this multi-zone detector is implemented in the metrology systems described herein.

Figure 6:
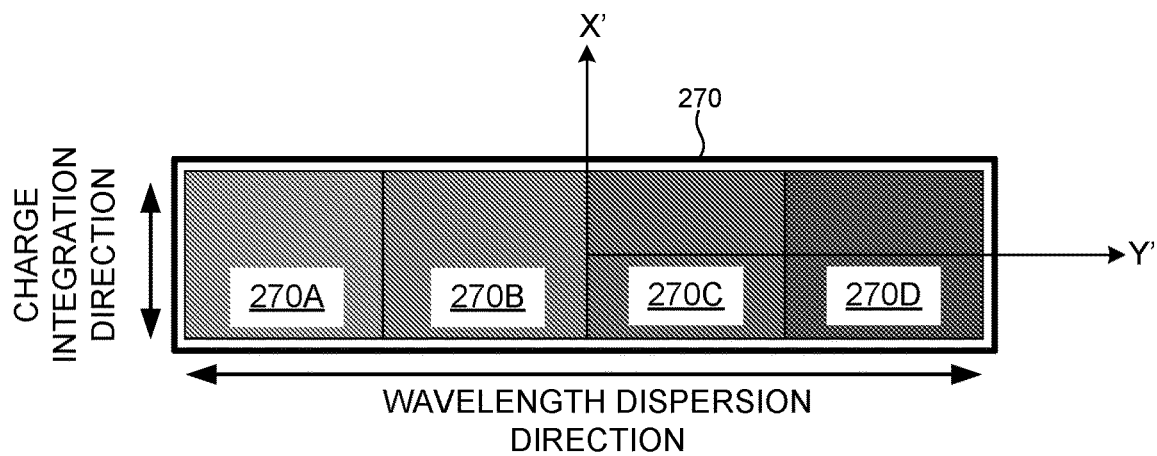
FIG. 6 depicts an illustration of a multi-zone infrared detector 270.

FIG. 6 depicts four sensor chips 270A-D derived from four different wavebands to make a multi-zone infrared detector 180. The four sensor chips include different material compositions that each exhibit different photosensitivity characteristics. As depicted in FIG. 6, sensor chip 270A exhibits high sensitivity over a waveband, A, sensor chip 270B exhibits high sensitivity over a waveband, B, sensor chip 270C exhibits high sensitivity over a waveband, C, and sensor chip 270D exhibits high sensitivity over a waveband, D. A metrology system incorporating detector 270 is configured to disperse wavelengths within waveband A onto sensor chip 270A, disperse wavelengths within waveband B onto sensor chip 270B, disperse wavelengths within waveband C onto sensor chip 270C, and disperse wavelengths within waveband D onto sensor chip 270D. In this manner, high photosensitivity (i.e., high SNR) is achieved over the aggregate waveband that includes wavebands A-D from a single detector. As a result measurement noise over the entire measurement range is reduced by limiting the use of a particular sensor to a narrowband where measurement sensitivity is high and measurement noise is low.

In some examples, a multi-zone detector includes InGaAs sensors with sensitivity to different spectral regions assembled in a single sensor package to produce a single, contiguous spectrum covering wavelengths from 750 nanometers to 3,000 nanometers, or beyond.

In general, any number of individual sensors may be assembled along the direction of wavelength dispersion of the multi-zone detector such that a contiguous spectrum may be derived from the detector. However, typically, two to four individual sensors are employed in a multi-zone detector, such as detector 270.

In one embodiment, three individual sensors are employed with the first segment spanning the range between 800 nanometers and 1600 nanometers, the second segment spanning the range between 1600 nanometers and 2200 nanometers, and the third segment spanning the range between 2200 nanometers and 2600 nanometers.

Although, the use of InGaAs based infrared detectors is specifically described herein, in general, any suitable material that exhibits narrow sensitivity ranges and sharp sensitivity cutoffs may be integrated into a multi-zone detector as described herein.

As depicted in FIG. 1, the illustrated measurement channel includes a polarizer on the illumination side and an analyzer on the collection side. However, in general, it is contemplated that any measurement channel may include, or not include, an illumination polarizer, a collection analyzer, an illumination compensator, a collection compensator, in any combination, to perform measurements of the polarized reflectivity of the sample, unpolarized reflectivity of the sample, or both.

In some embodiments, one or more measurement channels of the metrology system are configured to measure the wafer at different azimuth angles, in addition to different ranges of wavelength and angle of incidence. In some embodiments, a metrology system including an infrared spectrometer as described herein is configured to perform measurements of the wafer at azimuth angles of zero and ninety degrees relative to the metrology target. In some embodiments, the metrology system is configured to measure wafer reflectivity over one or more wavelength ranges, one or more AOI ranges, and one or more azimuth angles simultaneously. In some embodiments, a metrology system utilizes one or more combined LSP & supercontinuum sources in one or more spectroscopic ellipsometers, spectroscopic reflectometers, discrete wavelength ellipsometers, rotating polarizer ellipsometers, rotating compensator ellipsometers, rotating polarizer rotating compensator ellipsometers, Mueller-matrix ellipsometers, or any combination thereof.

In another further aspect, the dimensions of illumination field stop projected on wafer plane are adjusted to optimize the resulting measurement accuracy and speed based on the nature of target under measurement.

In another further aspect, the dimensions of illumination field stop are adjusted to achieve the desired spectral resolution for each measurement application.

In some examples, e.g., if the sample is a very thick film or grating structure, the illumination field stop projected on wafer plane in the direction perpendicular to the plane of incidence is adjusted to reduce the field size to achieve increase spectral resolution. In some examples, e.g., if the sample is a thin film, the illumination field stop projected on wafer plane in the direction perpendicular to the plane of incidence is adjusted to increase the field size to achieve a shortened measurement time without losing spectral resolution.

In the embodiment depicted in FIG. 1, computing system 130 is configured to receive signals 154 indicative of the spectral response detected by the detector subsystem. Computing system 130 is further configured to determine control signals 119 that are communicated to programmable illumination field stop 117. Programmable illumination field stop 117 receives control signals 119 and adjusts the size of the illumination aperture to achieve the desired illumination field size.

In some examples, the illumination field stop is adjusted to optimize measurement accuracy and speed as described hereinbefore. In another example, the illumination field stop is adjusted to prevent image clipping by the spectrometer slit and corresponding degradation of measurement results. In this manner, the illumination field size is adjusted such that the image of the measurement target underfills the spectrometer slit. In one example, the illumination field stop is adjusted such that the projection of the polarizer slit of the illumination optics underfills the spectrometer slit of the metrology system. In another example, the illumination field stop is adjusted such that the projection of the polarizer slit of the illumination optics overfills the spectrometer slit of the metrology system.

Figure 8:
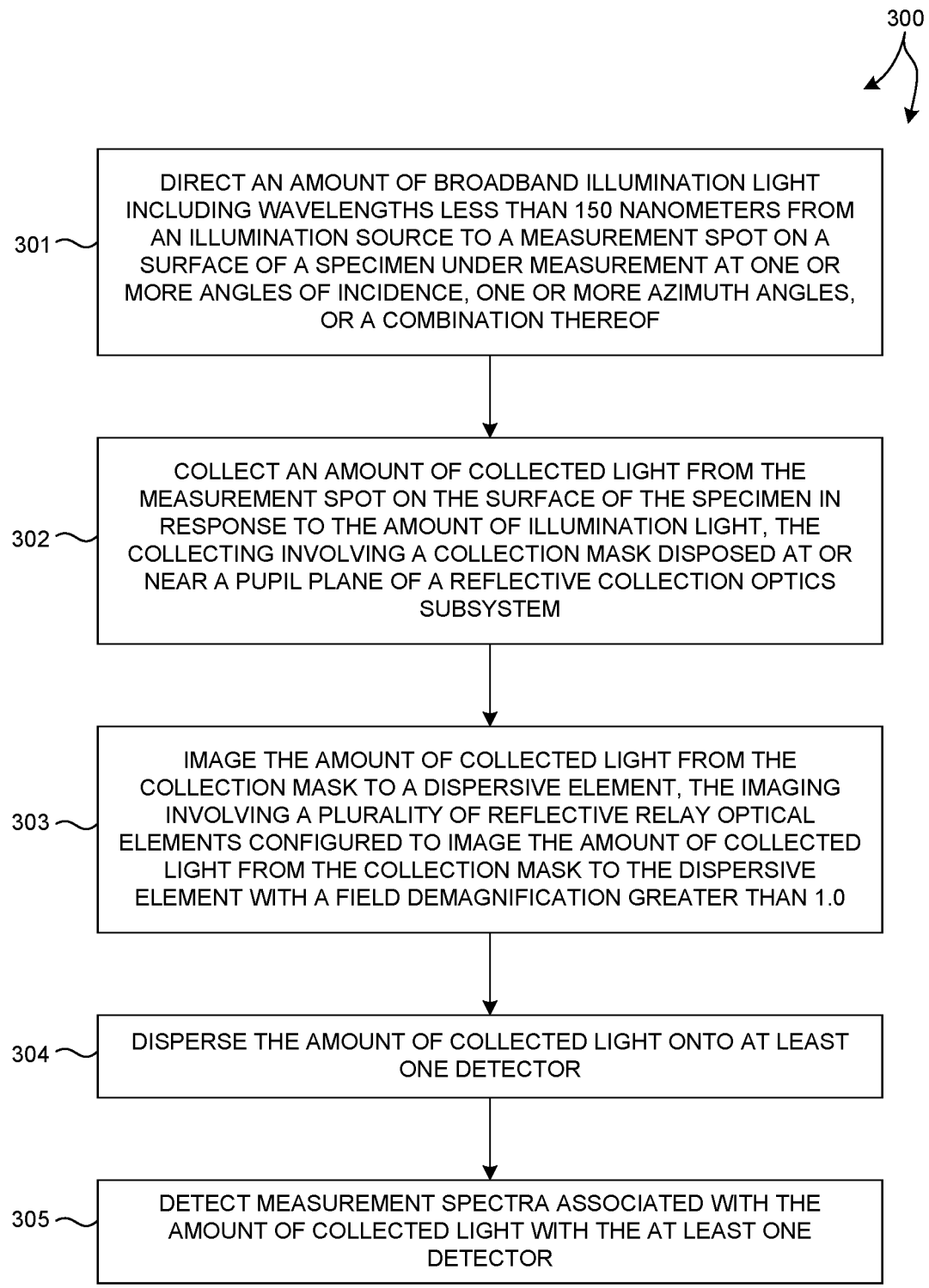
FIG. 8 illustrates a method 300 of performing spectroscopic measurements of one or more structures with collection relay optics having demagnification greater than one as described herein.

FIG. 8 illustrates a method 300 of performing spectroscopic measurements in at least one novel aspect. Method 300 is suitable for implementation by a metrology system such as metrology system 100 illustrated in FIG. 1 of the present invention. In one aspect, it is recognized that data processing blocks of method 300 may be carried out via a pre-programmed algorithm executed by one or more processors of computing system 130, or any other general purpose computing system. It is recognized herein that the particular structural aspects of metrology system 100 do not represent limitations and should be interpreted as illustrative only.

In block 301, an amount of broadband illumination light including wavelengths less than 150 nanometers is directed from an illumination source to a measurement spot on a surface of a specimen under measurement at one or more angles of incidence, one or more azimuth angles, or a combination thereof.

In block 302, an amount of light is collected from the measurement spot on the surface of the specimen in response to the amount of illumination light. The collecting involves a collection mask disposed at or near a pupil plane of a reflective collection optics subsystem.

In block 303, the amount of collected light is imaged from the collection mask to a dispersive element. The imaging involves a plurality of reflective relay optical elements configured to image the amount of collected light from the collection mask to the dispersive element with a field demagnification greater than 1.0;

In block 304, the amount of collected light is dispersed onto at least one detector.

In block 305, measurement spectra associated with the amount of collected light are detected by the at least one detector.

In a further embodiment, system 100 includes one or more computing systems 130 employed to perform measurements of actual device structures based on spectroscopic measurement data collected in accordance with the methods described herein. The one or more computing systems 130 may be communicatively coupled to the spectrometer. In one aspect, the one or more computing systems 130 are configured to receive measurement data associated with measurements of the structure of the specimen under measurement.

It should be recognized that one or more steps described throughout the present disclosure may be carried out by a single computer system 130 or, alternatively, a multiple computer system 130. Moreover, different subsystems of system 100 may include a computer system suitable for carrying out at least a portion of the steps described herein. Therefore, the aforementioned description should not be interpreted as a limitation on the present invention but merely an illustration.

In addition, the computer system 130 may be communicatively coupled to the spectrometers in any manner known in the art. For example, the one or more computing systems 130 may be coupled to computing systems associated with the spectrometers. In another example, the spectrometers may be controlled directly by a single computer system coupled to computer system 130.

The computer system 130 of metrology system 100 may be configured to receive and/or acquire data or information from the subsystems of the system (e.g., spectrometers and the like) by a transmission medium that may include wireline and/or wireless portions. In this manner, the transmission medium may serve as a data link between the computer system 130 and other subsystems of system 100.

Computer system 130 of metrology system 100 may be configured to receive and/or acquire data or information (e.g., measurement results, modeling inputs, modeling results, reference measurement results, etc.) from other systems by a transmission medium that may include wireline and/or wireless portions. In this manner, the transmission medium may serve as a data link between the computer system 130 and other systems (e.g., memory on-board metrology system 100, external memory, or other external systems). For example, the computing system 130 may be configured to receive measurement data from a storage medium (i.e., memory 132 or an external memory) via a data link. For instance, spectral results obtained using the spectrometers described herein may be stored in a permanent or semi-permanent memory device (e.g., memory 132 or an external memory). In this regard, the spectral results may be imported from on-board memory or from an external memory system. Moreover, the computer system 130 may send data to other systems via a transmission medium. For instance, a measurement model or an estimated parameter value 171 determined by computer system 130 may be communicated and stored in an external memory. In this regard, measurement results may be exported to another system.

Computing system 130 may include, but is not limited to, a personal computer system, mainframe computer system, workstation, image computer, parallel processor, or any other device known in the art. In general, the term "computing system" may be broadly defined to encompass any device having one or more processors, which execute instructions from a memory medium.

Program instructions 134 implementing methods such as those described herein may be transmitted over a transmission medium such as a wire, cable, or wireless transmission link. For example, as illustrated in FIG. 1, program instructions 134 stored in memory 132 are transmitted to processor 131 over bus 133. Program instructions 134 are stored in a computer readable medium (e.g., memory 132). Exemplary computer-readable media include read-only memory, a random access memory, a magnetic or optical disk, or a magnetic tape.

In some examples, the measurement models are implemented as an element of a SpectraShape® optical critical-dimension metrology system available from KLA-Tencor Corporation, Milpitas, California, USA. In this manner, the model is created and ready for use immediately after the spectra are collected by the system.

In some other examples, the measurement models are implemented off-line, for example, by a computing system implementing AcuShape® software available from KLA-Tencor Corporation, Milpitas, California, USA. The resulting, trained model may be incorporated as an element of an AcuShape® library that is accessible by a metrology system performing measurements.

In another aspect, the methods and systems for spectroscopic metrology of semiconductor devices described herein are applied to the measurement of high aspect ratio (HAR) structures, large lateral dimension structures, or both. The described embodiments enable optical critical dimension (CD), film, and composition metrology for semiconductor devices including three dimensional NAND structures, such as vertical-NAND (V-NAND) structures, dynamic random access memory structures (DRAM), etc., manufactured by various semiconductor manufacturers such as Samsung Inc. (South Korea), SK Hynix Inc. (South Korea), Toshiba Corporation (Japan), and Micron Technology, Inc. (United States), etc. These complex devices suffer from low light penetration into the structure(s) being measured. FIG. 3 depicts an exemplary high aspect ratio structure 160 that suffers from low light penetration into the structure(s) being measured. A spectroscopic ellipsometer with broadband capability and wide ranges of AOI, azimuth angle, or both, having simultaneous spectral band detection as described herein is suitable for measurements of these high-aspect ratio structures. HAR structures often include hard mask layers to facilitate etch processes for HARs. As described herein, the term "HAR structure" refers to any structure characterized by an aspect ratio that exceeds 2:1 or 10:1, and may be as high as 100:1, or higher.

In yet another aspect, the measurement results described herein can be used to provide active feedback to a process tool (e.g., lithography tool, etch tool, deposition tool, etc.). For example, values of measured parameters determined based on measurement methods described herein can be communicated to a lithography tool to adjust the lithography system to achieve a desired output. In a similar way etch parameters (e.g., etch time, diffusivity, etc.) or deposition parameters (e.g., time, concentration, etc.) may be included in a measurement model to provide active feedback to etch tools or deposition tools, respectively. In some example, corrections to process parameters determined based on measured device parameter values and a trained measurement model may be communicated to a lithography tool, etch tool, or deposition tool.

As described herein, the term "critical dimension" includes any critical dimension of a structure (e.g., bottom critical dimension, middle critical dimension, top critical dimension, sidewall angle, grating height, etc.), a critical dimension between any two or more structures (e.g., distance between two structures), and a displacement between two or more structures (e.g., overlay displacement between overlaying grating structures, etc.). Structures may include three dimensional structures, patterned structures, overlay structures, etc.

As described herein, the term "critical dimension application" or "critical dimension measurement application" includes any critical dimension measurement.

As described herein, the term "metrology system" includes any system employed at least in part to characterize a specimen in any aspect, including measurement applications such as critical dimension metrology, overlay metrology, focus/dosage metrology, and composition metrology. However, such terms of art do not limit the scope of the term "metrology system" as described herein. In addition, the metrology system 100 may be configured for measurement of patterned wafers and/or unpatterned wafers. The metrology system may be configured as a LED inspection tool, edge inspection tool, backside inspection tool, macro-inspection tool, or multi-mode inspection tool (involving data from one or more platforms simultaneously), and any other metrology or inspection tool that benefits from the calibration of system parameters based on critical dimension data.

Various embodiments are described herein for a semiconductor measurement system that may be used for measuring a specimen within any semiconductor processing tool (e.g., an inspection system or a lithography system). The term "specimen" is used herein to refer to a wafer, a reticle, or any other sample that may be processed (e.g., printed or inspected for defects) by means known in the art.

As used herein, the term "wafer" generally refers to substrates formed of a semiconductor or non-semiconductor material. Examples include, but are not limited to, monocrystalline silicon, gallium arsenide, and indium phosphide. Such substrates may be commonly found and/or processed in semiconductor fabrication facilities. In some cases, a wafer may include only the substrate (i.e., bare wafer). Alternatively, a wafer may include one or more layers of different materials formed upon a substrate. One or more layers formed on a wafer may be "patterned" or "unpatterned." For example, a wafer may include a plurality of dies having repeatable pattern features.

A "reticle" may be a reticle at any stage of a reticle fabrication process, or a completed reticle that may or may not be released for use in a semiconductor fabrication facility. A reticle, or a "mask," is generally defined as a substantially transparent substrate having substantially opaque regions formed thereon and configured in a pattern. The substrate may include, for example, a glass material such as amorphous SiO2. A reticle may be disposed above a resist-covered wafer during an exposure step of a lithography process such that the pattern on the reticle may be transferred to the resist.

One or more layers formed on a wafer may be patterned or unpatterned. For example, a wafer may include a plurality of dies, each having repeatable pattern features. Formation and processing of such layers of material may ultimately result in completed devices. Many different types of devices may be formed on a wafer, and the term wafer as used herein is intended to encompass a wafer on which any type of device known in the art is being fabricated.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A spectroscopic metrology system comprising:
an illumination source configured to generate an amount of illumination light including wavelengths less than 150 nanometers;
an illumination optics subsystem configured to direct the amount of illumination light from the illumination source to a measurement spot on a surface of a specimen under measurement at one or more angles of incidence, one or more azimuth angles, or a combination thereof;
a reflective collection optics subsystem configured to collect an amount of collected light from the measurement spot on the surface of the specimen, the reflective collection optics subsystem including a collection mask disposed at or near a pupil plane of the reflective collection optics subsystem and a plurality of reflective relay optical elements, the plurality of reflective relay optical elements configured to image the amount of collected light from the collection mask to a dispersive element of the spectroscopic metrology system with a field demagnification greater than 1.0 in imaging space;
at least one detector having a planar, two-dimensional surface sensitive to incident light, the at least one detector configured to detect the amount of collected light dispersed by the dispersive element and generate output signals indicative of the detected light; and
a computing system configured to generate an estimated value of a parameter of interest of the specimen under measurement based on an analysis of the output signals.

2. The metrology system of claim 1, wherein an illumination Numerical Aperture (NA) of the illumination optics subsystem at the measurement spot is at least 0.1.

3. The metrology system of claim 1, wherein a collection Numerical Aperture (NA) of the reflective collection optics subsystem at the measurement spot is less than 0.05.

4. The metrology system of claim 1, wherein the plurality of reflective relay optical elements is configured to image the amount of collected light from the collection mask to the dispersive element with a field demagnification greater than 2.0 in imaging space.

5. The metrology system of claim 1, wherein the collection mask includes a plurality of apertures, each aperture configured to transmit the amount of collected light associated with a different angle of incidence from the specimen under measurement.

6. The metrology system of claim 1, wherein the illumination source is a combined illumination source including a laser sustained plasma (LSP) illumination source and a supercontinuum laser illumination source.

7. The metrology system of claim 1, wherein the at least one detector includes two or more detectors, wherein each of the two or more detectors detects a portion of the amount of collected light over different spectral ranges.

8. The metrology system of claim 7, wherein each of the two or more detectors detects each portion of the amount of collected light over different spectral ranges simultaneously.

9. The metrology system of claim 1, wherein the at least one detector includes two or more different surface areas each having different photosensitivity, wherein the two or more different surface areas are aligned with a direction of wavelength dispersion across the surface of the at least one detector.

10. The metrology system of claim 1, wherein the specimen under measurement includes a three dimensional NAND structure or a dynamic random access memory structure.

11. A method comprising:
directing an amount of broadband illumination light including wavelengths less than 150 nanometers from an illumination source to a measurement spot on a surface of a specimen under measurement at one or more angles of incidence, one or more azimuth angles, or a combination thereof;
collecting an amount of collected light from the measurement spot on the surface of the specimen in response to the amount of illumination light, the collecting involving a collection mask disposed at or near a pupil plane of a reflective collection optics subsystem;
imaging the amount of collected light from the collection mask to a dispersive element, the imaging involving a plurality of reflective relay optical elements configured to image the amount of collected light from the collection mask to the dispersive element with a field demagnification greater than 1.0 in imaging space;
dispersing the amount of collected light onto at least one detector; and
detecting measurement spectra associated with the amount of collected light with the at least one detector.

12. The method of claim 11, wherein an illumination Numerical Aperture (NA) of the illumination optics subsystem at the measurement spot is at least 0.1.

13. The method of claim 11, wherein a collection Numerical Aperture (NA) of the reflective collection optics subsystem at the measurement spot is less than 0.05.

14. The method of claim 11, wherein the plurality of reflective relay optical elements is configured to image the amount of collected light from the collection mask to the dispersive element with a field demagnification greater than 2.0 in imaging space.

15. The method of claim 11, wherein the collection mask includes a plurality of apertures, each aperture configured to transmit the amount of collected light associated with a different angle of incidence from the specimen under measurement.

16. The method of claim 11, wherein the illumination source is a combined illumination source including a laser sustained plasma (LSP) illumination source and a supercontinuum laser illumination source.

17. The method of claim 11, wherein the at least one detector includes two or more detectors, wherein each of the two or more detectors detects a portion of the amount of collected light over different spectral ranges.

18. The method of claim 17, wherein each of the two or more detectors detects each portion of the amount of collected light over different spectral ranges simultaneously.

19. The method of claim 11, wherein the at least one detector includes two or more different surface areas each having different photosensitivity, wherein the two or more different surface areas are aligned with a direction of wavelength dispersion across the surface of the at least one detector.

20. A spectroscopic metrology system comprising:
an illumination source configured to generate an amount of illumination light including wavelengths less than 150 nanometers;
an illumination optics subsystem configured to direct the amount of illumination light from the illumination source to a measurement spot on a surface of a specimen under measurement at one or more angles of incidence, one or more azimuth angles, or a combination thereof;
a reflective collection optics subsystem configured to collect an amount of collected light from the measurement spot on the surface of the specimen, the reflective collection optics subsystem including a collection mask disposed at or near a pupil plane of the reflective collection optics subsystem and a plurality of reflective relay optical elements, the plurality of reflective relay optical elements configured to image the amount of collected light from the collection mask to a dispersive element of the spectroscopic metrology system with a field demagnification greater than 1.0 in imaging space;
at least one detector having a planar, two-dimensional surface sensitive to incident light, the at least one detector configured to detect the amount of collected light dispersed by the dispersive element and generate output signals indicative of the detected light; and
a non-transitory, computer-readable medium storing instructions that, when executed by one or more processors, causes the one or more processors to:
generate an estimated value of a parameter of interest of the specimen under measurement based on an analysis of the output signals.

\* \* \* \* \*